(12) United States Patent
Yang et al.

(10) Patent No.: US 8,764,374 B2
(45) Date of Patent: Jul. 1, 2014

(54) SEPARATING TOOL FOR FEEDING RECEPTACLE

(75) Inventors: Bo Yang, Shenzhen (CN); Bing Li, Shenzhen (CN); Yong Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/480,486

(22) Filed: May 25, 2012

(65) Prior Publication Data

US 2013/0071222 A1 Mar. 21, 2013

(30) Foreign Application Priority Data

Sep. 16, 2011 (CN) .......................... 2011 1 0275550

(51) Int. Cl.
*B65G 59/10* (2006.01)
*B65G 65/04* (2006.01)
*B65G 59/00* (2006.01)
*B65G 21/02* (2006.01)
*B65H 3/00* (2006.01)

(52) U.S. Cl.
USPC ...................... 414/795.6; 414/797.5; 221/251; 221/221; 221/297

(58) Field of Classification Search
USPC .......................... 211/150; 221/210, 221, 251; 414/222.07, 222.09, 259, 331.06, 414/331.09, 331.11, 354, 356, 357, 365, 414/370, 404, 414, 416.04, 416.05, 416.07, 414/788.2, 794.9, 795.2, 795.3, 795.4, 414/795.6, 797.4, 797.5, 797.8, 797.9, 798, 414/798.1, 798.4, 929
See application file for complete search history.

(56) References Cited

U.S. PATENT DOCUMENTS

| | | | | | |
|---|---|---|---|---|---|
| 3,181,728 | A | * | 5/1965 | West et al. | 221/221 |
| 3,419,186 | A | * | 12/1968 | Cease | 221/221 |
| 3,677,439 | A | * | 7/1972 | Bosworth et al. | 221/251 |
| 4,477,219 | A | * | 10/1984 | Sauder | 414/798.1 |

FOREIGN PATENT DOCUMENTS

| | | | | | |
|---|---|---|---|---|---|
| JP | 56023129 | A | * | 3/1981 | B65G 59/06 |
| JP | 61254423 | A | * | 11/1986 | B65G 57/30 |
| JP | 08310658 | A | * | 11/1996 | B65G 60/00 |

* cited by examiner

*Primary Examiner* — Gregory Adams
(74) *Attorney, Agent, or Firm* — Novak Druce Connolly Bove + Quigg LLP

(57) ABSTRACT

A separating tool for separating out objects one by one from a stack of objects includes a support base, an assembly plate positioned on the support base, a vertical sliding assembly slidably positioned on the assembly plate, and two opposing clamping members connected to the vertical sliding assembly. Each clamping member includes an engaging plate, a connecting shaft fixed to the engaging plate, and a cam base positioned on the support base. The cam base defines a cam slot, and the connecting shaft slides in the cam slot. A distance from a top end of the cam slot to the engaging plate is less than that from a bottom end of the cam slot to the engaging plate, such that the engaging plates of the two clamping members move together when the engaging plates are moved upwards with the connecting shaft.

17 Claims, 5 Drawing Sheets

SEPARATING TOOL FOR FEEDING RECEPTACLE

BACKGROUND

1. Technical Field

The present disclosure generally relates to separating tools, and particularly, to a separating tool for separating a plurality of feeding receptacles stacked together.

2. Description of the Related Art

In a production line, the products may be positioned in feeding receptacles. The feeding receptacles are manually separated from each other, and then fed onto the production line. Therefore, the labor costs of the production line are increased. Furthermore, an operator cannot precisely control the loading time of each receptacle, thereby reducing the feeding efficiency of the production line.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
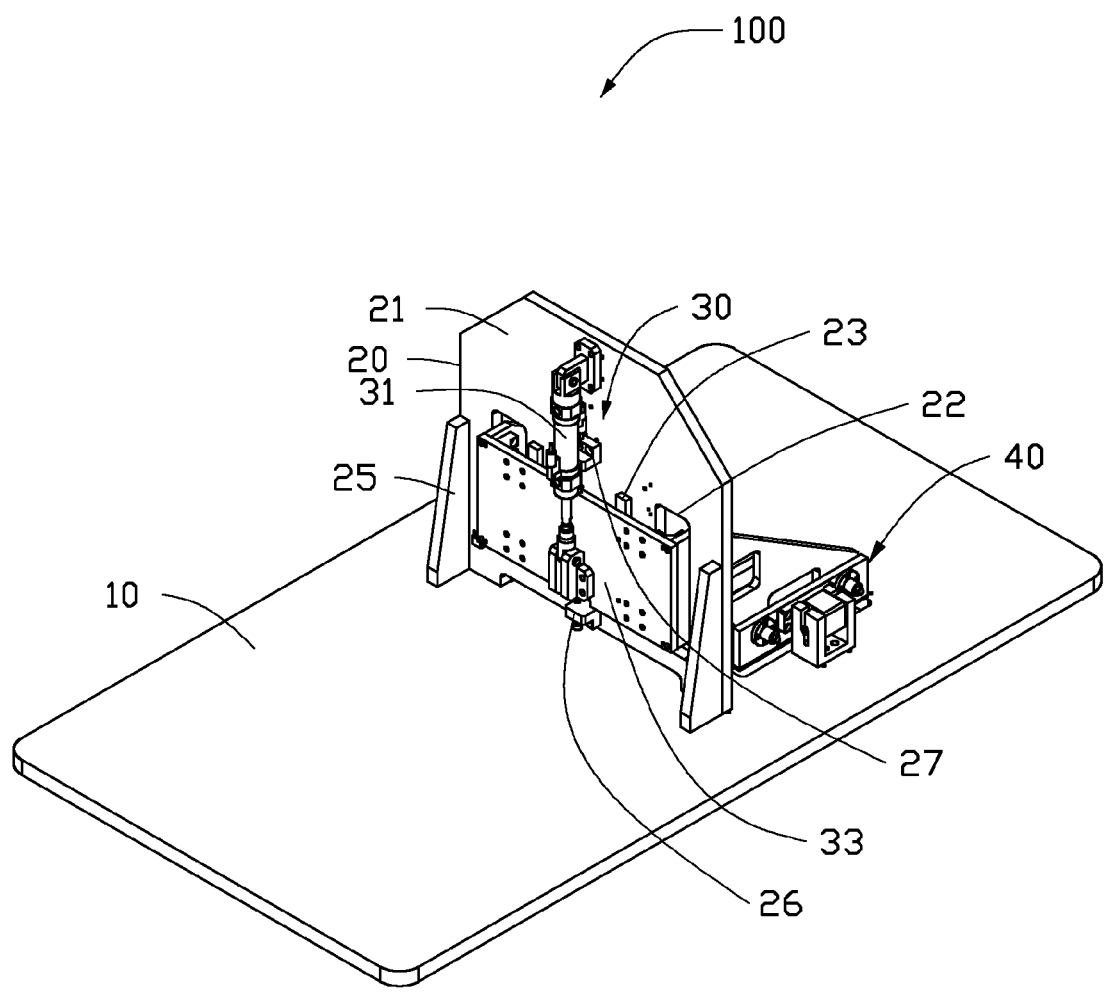
FIG. 1 is an isometric, assembled view of a first embodiment of a separating tool including a support base, an assembly plate, a vertical sliding assembly, and two clamping members.
Figure 2:
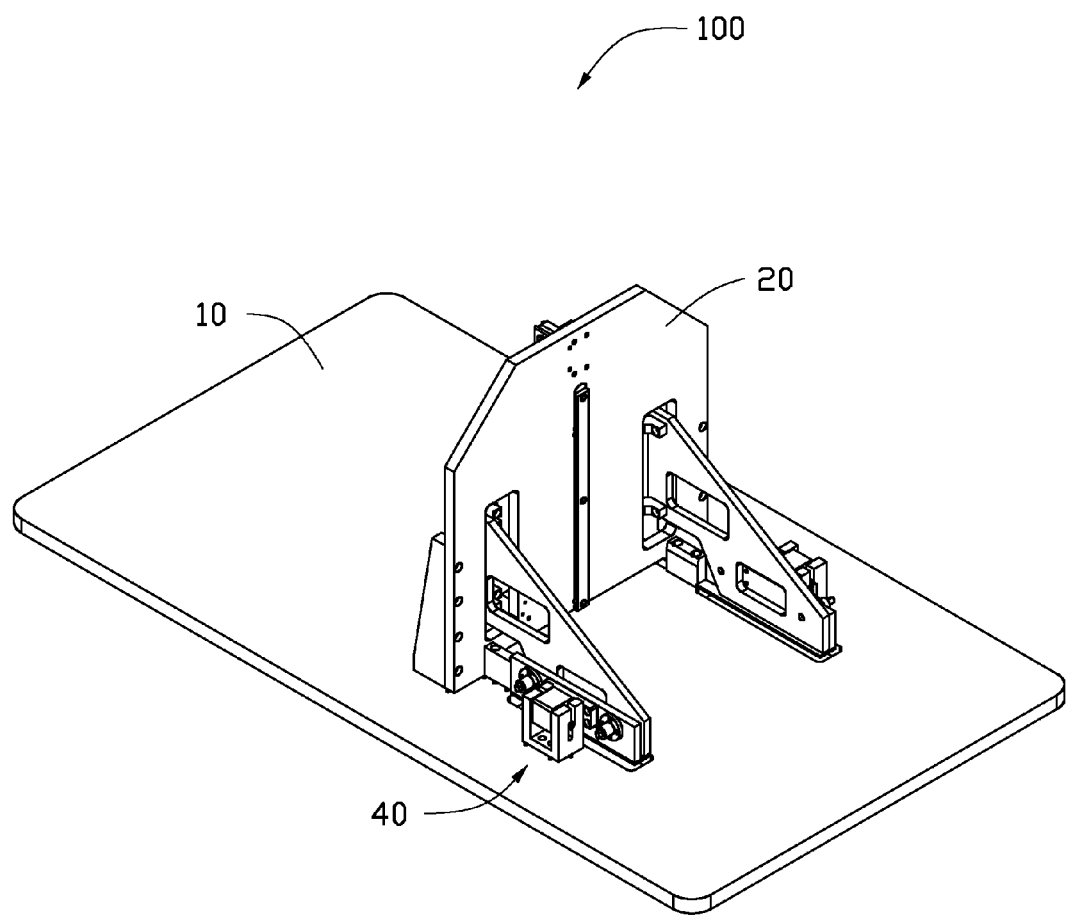
FIG. 2 is similar to FIG. 1, but viewed from another aspect.

Referring to FIGS. 1 and 2, an embodiment of a separating tool 100 includes a support base 10, an assembly plate 20, a vertical sliding assembly 30, and two clamping members 40. The separating tool 100 is configured for separating a plurality of feeding receptacles 50 (see FIG. 4) which stacked together.

In an illustrated embodiment, the support base 10 is substantially rectangular, and the assembly plate 20 is perpendicularly fixed on a middle of the support base 10. The assembly plate 20 defines two sliding grooves 22 on opposite edges thereof, and forms a guiding rail 23 between the sliding grooves 22 on a side surface 21 of the assembly plate 20. The assembly plate 20 forms two strengthening ribs 25 on opposite edges of the side surface 21. Each strengthen rib 25 is positioned at a side of the sliding groove 22 away from the guiding rail 23. The strengthen ribs 25 are fixed to the support base 10.

The vertical sliding assembly 30 is positioned on the side surface 21 of the assembly plate 20, and includes a driving member 31 and a sliding plate 33. An end of the driving member 31 is fixed on the assembly plate 20, and the other end of the driving member 31 is fixed to the sliding plate 33. The sliding plate 33 is positioned on the guiding rail 23. The sliding plate 33 can be driven to move along the guiding rail 23 by the driving member 31. In the illustrated embodiment, the driving member 31 is an air cylinder or air-powered ram.

A first restricting member 26 and a second restricting member 27 are formed on the assembly plate 20, and the sliding plate 33 is positioned between the first restricting member 26 and the second restricting member 27. The sliding plate 33 can be slid to abut the first restricting member 26 or the second restricting member 27, the driving member 31 drives the sliding plate 33 between limits of the first restricting member 26 and the second restricting member 27.

Figure 3:
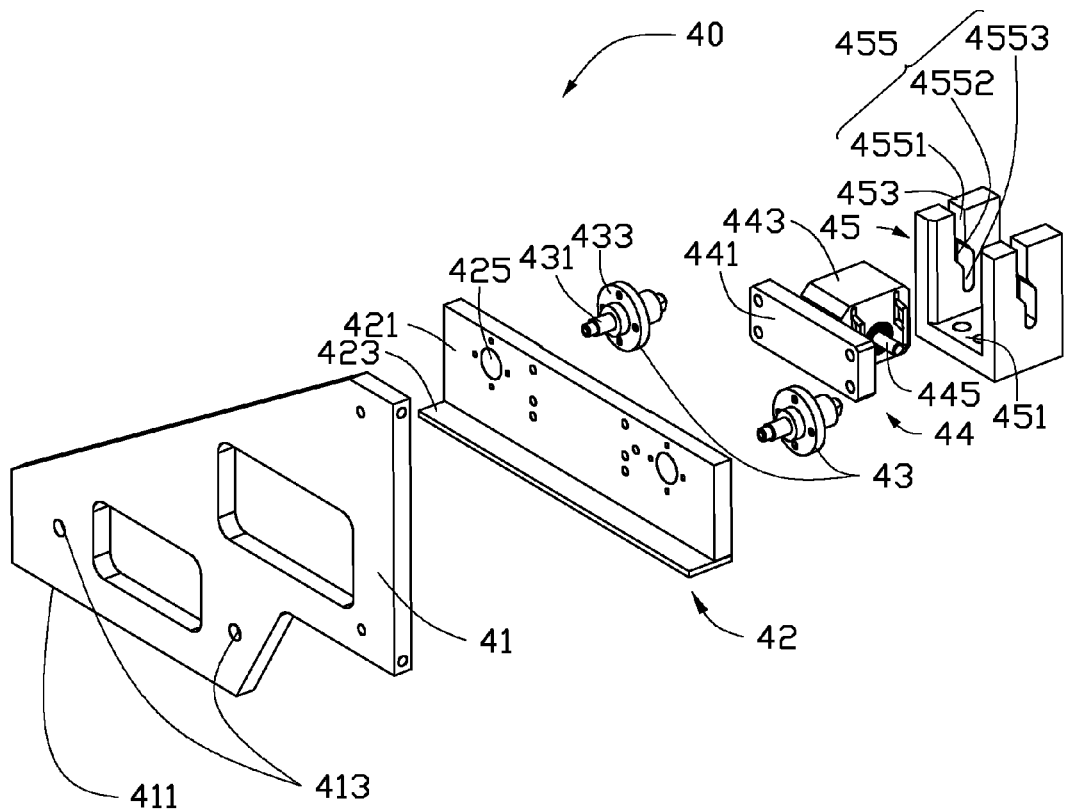
FIG. 3 is an isometric, exploded view of one of the clamping members of FIG. 1.

Referring to FIG. 3, each clamping member 40 includes a support plate 41, an engaging plate 42, two bearings 43, a shaft assembly 44, and a cam base 45. The support plate 41 extends through one sliding groove 22, and is fixed to the sliding plate 33. The engaging plate 42 is movably connected to the support plate 41 via the bearings 43. The shaft assembly 44 is fixed to the engaging plate 42. The shaft assembly 44 is detachably connected to the cam base 45, and the cam base 45 is fixed on the support base 10.

The support plate 41 includes a bottom surface 411, and defines two first assembly holes 413. The engaging plate 42 is substantially L-shaped, and includes a fixing portion 421 and an engaging portion 423 perpendicular to the fixing portion 421. The fixing portion 421 defines two second assembly holes 425. Each bearing 43 includes a shaft portion 431 and a flange portion 433. The shaft portion 431 extends through the first assembly hole 413 and the second assembly hole 425, and the flange portion 433 is fixed on the fixing portion 421, such that the engaging plate 42 is fixed to the support plate 41, with the engaging portion 423 abutting the bottom surface 411 of the support plate 41. The engaging plate 42 can slide along the shaft portion 431 of the bearing 43 relative to the support plate 41, such that the engaging portion 423 moves along the bottom surface 411 of the support plate 41.

The shaft assembly 44 includes an assembly base 441, a shaft base 443, and a connecting shaft 445. The assembly base 441 is fixed to the shaft base 443, and the connecting shaft 445 is rotatably received in the shaft base 443. The assembly base 441 is fixed to the fixing portion 421.

The cam base 45 is substantially U-shaped, and includes a bottom wall 451 and two side walls 453 extending from opposite sides of the bottom wall 451. The bottom wall 451 is fixed to the support base 10. Each side wall 453 defines a cam slot 455 having a first section 4551, a second section 4552, and a third section 4553. The first section 4551 is parallel to the third section 4553, and a distance between the first section 4551 and the engaging plate 42 is less than that between the third section 4553 and the engaging plate 42. The second section 4552 connects the first section 4551 and the third section 4553. The connecting shaft 445 is received in the cam slots 455 of the cam base 45.

Figure 4:
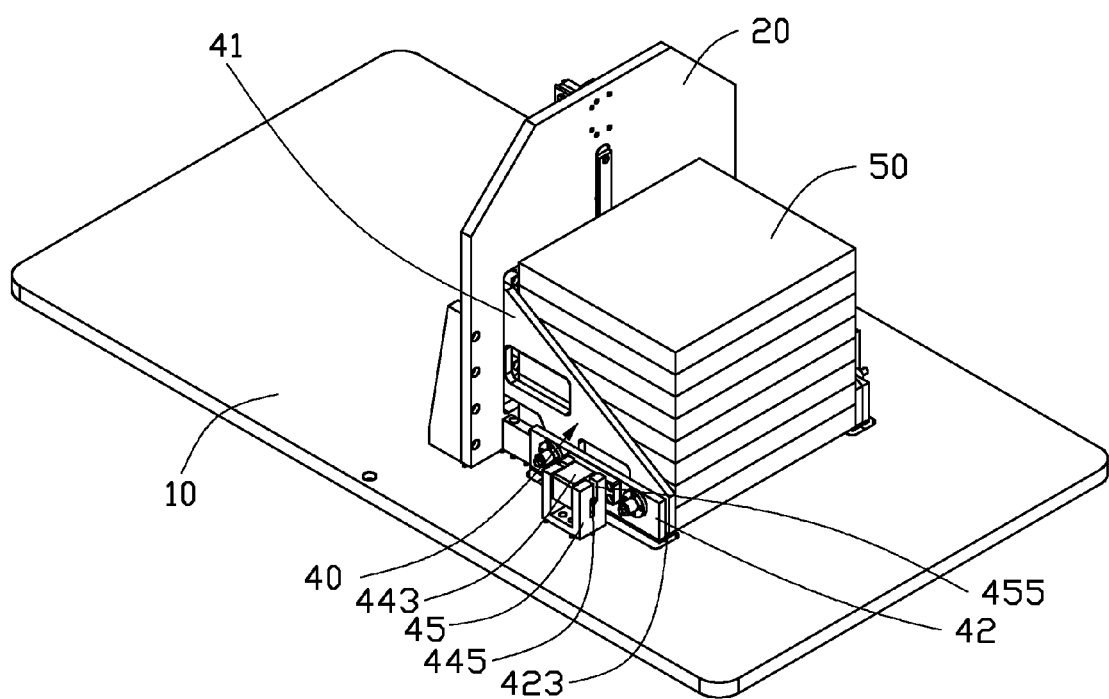
FIG. 4 is an isometric view of the separating tool of FIG. 1 with a plurality of feeding receptacles stacked on it.
Figure 5:
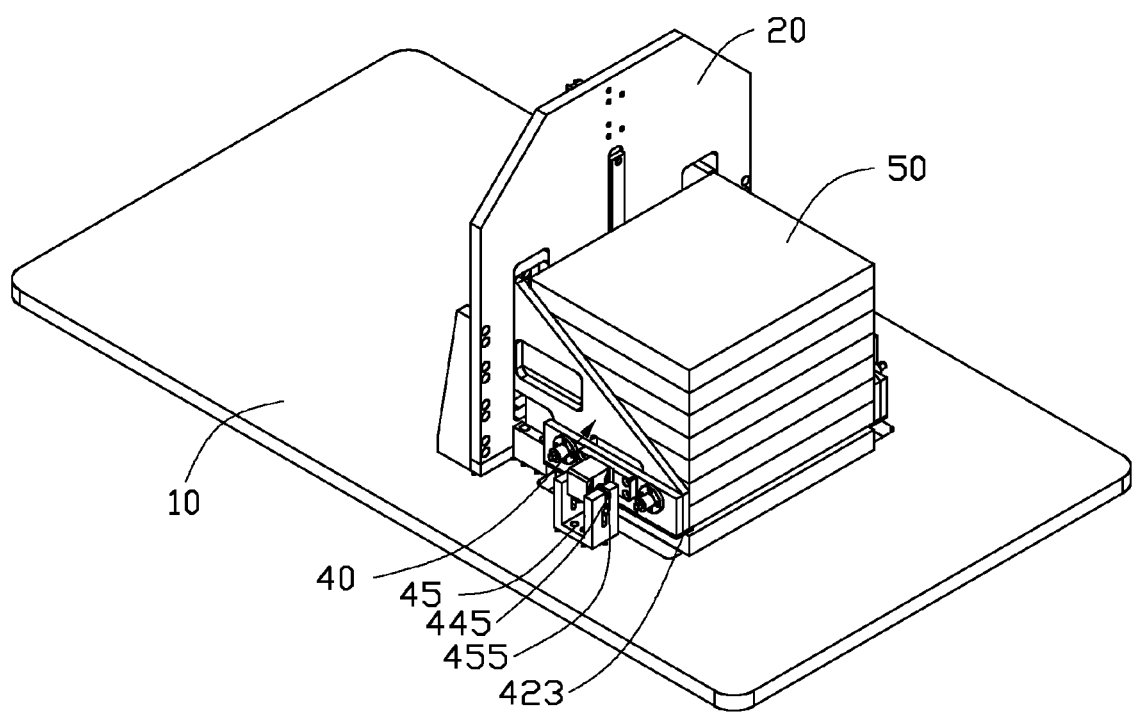
FIG. 5 is an isometric view of the separating tool of FIG. 4 separating the plurality of feeding receptacles.

Referring to FIGS. 3 through 5, in use, the plurality of feeding receptacles 50 are stacked together on the separating tool 100 and positioned between the clamping members 40 (see FIG. 4). The driving member 31 drives the sliding plate 33 upwards, and the support plate 41 moves together with the sliding plate 33, therefore, the engaging plate 42 and the shaft assembly 44 move upwards by drive of the support plate 41. The connecting shaft 445 slides in the cam slot 455 away from the bottom wall 451 of the cam base 45, that is, the connecting shaft 445 slides from the third section 4553 into the first section 4551. The distance between the first section 4551 and the engaging plate 42 being less than that between the third section 4553 and the engaging plate 42, the engaging plate 42 moves towards the support plate 41 due to the pushing of the shaft assembly 44 when the engaging plate 42 moves upwards, such that the engaging portion 423 of the engaging plate 42 extends out of the inner side of the support plate 41. When the sliding plate 33 abuts the second restricting member 27, the driving member 31 stops driving the sliding plate 33. Then, the engaging portion 423 is inserted between the bottom feeding receptacle 50 and the feeding receptacles 50 stacked above it, thereby separating the bottom feeding receptacle 50 from the others (see FIG. 5). The bottom feeding receptacle 50 is then taken out of the separating tool 100.

The driving member 31 then drives the sliding plate 33 to slide upwards, and then the engaging plate 42 moves away from the support plate 41 to follow the connecting shaft 445 sliding from the first section 4551 to the third section 4553. Therefore, the engaging portion 423 is drawn back to the bottom surface 411 of the support plate 41. Repeatedly driving the sliding plate 33 upwards and downwards, each of the plurality of feeding receptacles 50 is separated one by one from the stack.

In alternative embodiments, the cam slot 455 can be other shapes, such as arcuate, however, a distance from a top end of the cam slot 455 to the engaging plate 42 is less than that from a bottom end of the cam slot 455 to the engaging plate 42.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A separating tool for separating at least two feeding receptacles from each other, comprising:
    a support base;
    an assembly plate positioned on the support base,
    a vertical sliding assembly slidably positioned on the assembly plate; and
    a pair of clamping members connected to the vertical sliding assembly and opposite to each other;
    wherein each clamping member comprises a support plate fixed to the vertical sliding assembly, an engaging plate movably connected to the support plate, a connecting shaft fixed to the engaging plate, and a cam base positioned on the support base; the cam base defines a cam slot, and the connecting shaft is slidably received in the cam slot; a distance from a top end of the cam slot to the engaging plate is less than that from a bottom end of the cam slot to the engaging plate, such that the engaging plates of the two clamping members move close to each other when the engaging plates move upwards together with the connecting shaft.

2. The separating tool of claim 1, wherein the cam base comprises a bottom wall and two side walls extending from opposite sides of the bottom wall; the bottom wall is fixed to the support base, and each side wall defines the cam slot for slidably receiving the connecting shaft.

3. The separating tool of claim 2, wherein the cam slot has a first section, a second section, and a third section; the first section is parallel to the third section, and a distance between the first section and the engaging plate is less than that between the third section and the engaging plate; the second section connects the first section and the third section.

4. The separating tool of claim 1, wherein the support plate has a bottom surface, the engaging plate comprises a fixing portion and an engaging portion extending from an end of the fixing portion, and the engaging portion abuts against bottom surface of the support plate.

5. The separating tool of claim 4, wherein each of the clamping members further comprises a bearing movably connecting the support plate to the fixing portion of the engaging plate.

6. The separating tool of claim 1, wherein the vertical sliding assembly comprising a driving member and a sliding plate fixed to the driving member, and the sliding plate is connected to the assembly plate.

7. The separating tool of claim 6, wherein the assembly plate forms a guiding rail on which the sliding plate is positioned.

8. The separating tool of claim 6, wherein the assembly plate further forms a first restricting member and a second restricting member; the sliding plate is positioned between the first restricting member and the second restricting member.

9. The separating tool of claim 1, wherein the assembly plate defines two sliding grooves, and the clamping members extend through the sliding grooves and fixed to the vertical sliding assembly.

10. A separating tool for separating at least two feeding receptacles from each other, comprising:
    a support base;
    an assembly plate positioned on the support base; and
    two clamping members slidably connected to the assembly plate and positioned on opposite sides of the at least two feeding receptacles;
    wherein each clamping member comprises a support plate slidably connected to the assembly plate, an engaging plate movably connected to the support plate, a connecting shaft fixed to the engaging plate, and a cam base positioned on the support base; the cam base defines a cam slot, and the connecting shaft is slidably received in the cam slot; a distance from a top end of the cam slot to the engaging plate is less than that from a bottom end of the cam slot to the engaging plate.

11. The separating tool of claim 10, wherein the cam base comprises a bottom wall and two side walls extending from opposite sides of the bottom wall; the bottom wall 451 is fixed to the support base, and each side wall defines the cam slot for slidably receiving the connecting shaft.

12. The separating tool of claim 11, wherein the cam slot has a first section, a second section and a third section; the first section is parallel to the third section, and a distance between the first section and the engaging plate is less than that between the third section and the engaging plate; the second section connects the first section and the third section.

13. The separating tool of claim 10, wherein the support plate has a bottom surface, the engaging plate comprises a fixing portion and an engaging portion extending from an end of the fixing portion, and the engaging portion abuts against bottom surface of the support plate.

14. The separating tool of claim 13, wherein each of the clamping members further comprises a bearing movably connecting the support plate to the fixing portion of the engaging plate.

15. The separating tool of claim 14, wherein the assembly plate forms a guiding rail on which the sliding plate is positioned.

16. The separating tool of claim 14, wherein the assembly plate further forms a first restricting member and a second restricting member; the sliding plate is positioned between the first restricting member and the second restricting member.

17. The separating tool of claim 10, wherein the assembly plate defines two sliding grooves, and the clamping members extend through the sliding grooves.

* * * * *